United States Patent [19]

Froese-Peeck et al.

[11] Patent Number: 4,955,680
[45] Date of Patent: Sep. 11, 1990

[54] METHOD AND APPARATUS FOR AUTOMATICALLY ADJUSTING THE FOCUS OF CATHODE RAY TUBES

[75] Inventors: Ruediger Froese-Peeck; Richard Poleschinski, both of Munich, Fed. Rep. of Germany

[73] Assignee: Siemens Aktiengesellschaft, Berlin and Munich, Fed. Rep. of Germany

[21] Appl. No.: 318,830

[22] Filed: Mar. 6, 1989

[30] Foreign Application Priority Data

Mar. 22, 1988 [DE] Fed. Rep. of Germany ....... 3809602

[51] Int. Cl.⁵ .............................................. H01J 29/58
[52] U.S. Cl. .................................... 315/382; 358/218; 358/10
[58] Field of Search .................... 315/382; 358/218, 10

[56] References Cited

U.S. PATENT DOCUMENTS

| | | | |
|---|---|---|---|
| 3,450,833 | 6/1969 | Hobrough | 358/218 |
| 3,962,722 | 6/1976 | Ciciora | |
| 4,163,308 | 8/1979 | Tawa et al. | |
| 4,193,086 | 3/1980 | Kwaguchi | |
| 4,441,120 | 4/1984 | Gerritsen | |
| 4,551,653 | 11/1985 | Hilsum | |
| 4,607,288 | 8/1986 | Freyberger | 358/242 |
| 4,746,985 | 5/1988 | Waldron et al. | 358/218 |

FOREIGN PATENT DOCUMENTS

| | | |
|---|---|---|
| 0105792 | 4/1984 | European Pat. Off. |
| 0119282 | 9/1984 | European Pat. Off. |
| 12030417 | 4/1972 | Fed. Rep. of Germany |
| 2746969 | 4/1978 | Fed. Rep. of Germany |
| 2805691 | 8/1979 | Fed. Rep. of Germany |
| 3047340 | 9/1981 | Fed. Rep. of Germany |
| 2839187 | 4/1985 | Fed. Rep. of Germany |
| 3107042 | 3/1986 | Fed. Rep. of Germany |
| 2497399 | 12/1981 | France |

OTHER PUBLICATIONS

Japanese Abstract vol. 10, No. 297 E-444, 2353 Oct. 9, 1986.
Article, A Technigue for the Automated Measurement of the Resolution of Shadow-Mask CRT Displays by Veron and O'Callaghan SID 87 Digets, pp. 211-213.
Article in Funkschau 5/1986, pp. 40-42.

Primary Examiner—Theodore M. Blum
Attorney, Agent, or Firm—Hill, Van Santen, Steadman & Simpson

[57] ABSTRACT

Method and apparatus for automatically adjusting the focus of cathode ray tubes which can be utilized with cathode ray tubes used as monitors or for television sets that are operated with different field frequencies and different number of scan lines. A specific image such as a fine checkerboard pattern or a fine line pattern is produced on the monitor which is to be adjusted and the image is then picked up with a solid state camera; the image magnification and resolution are selected such that the fine pattern is acquired with full resolution in the camera signal. The camera signal is evaluated using a known image processing system and the image focus of the image acquired by the camera is calculated by using histogram calculations. The width of the histogram curve is a measure of the image focus and the image focus is either manually or automatically adjusted.

6 Claims, 2 Drawing Sheets

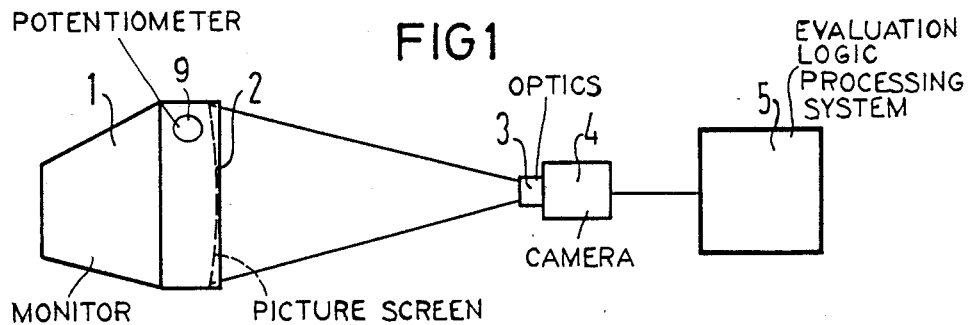
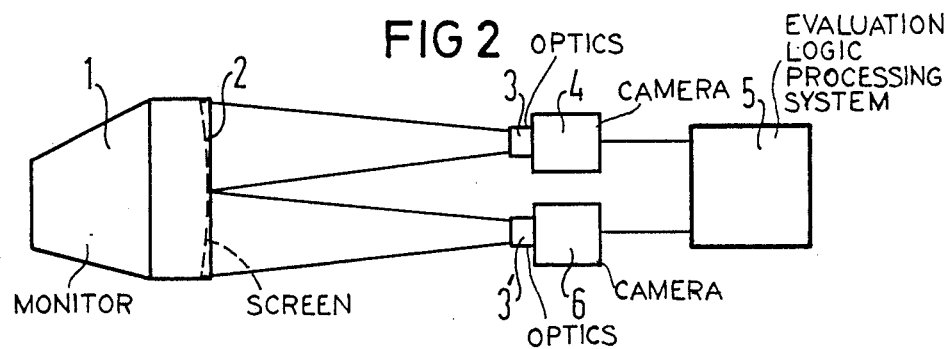
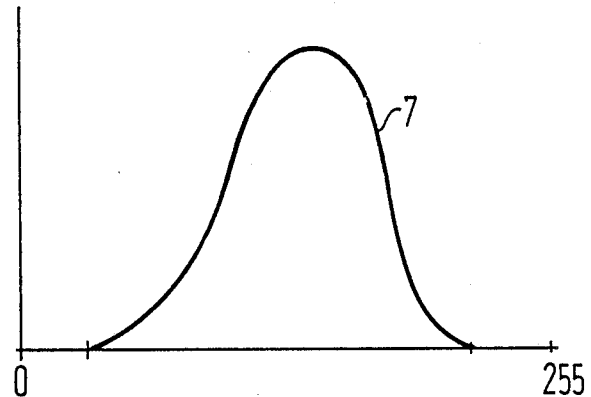

METHOD AND APPARATUS FOR AUTOMATICALLY ADJUSTING THE FOCUS OF CATHODE RAY TUBES

BACKGROUND OF THE INVENTION

1. Field of the Invention

This invention relates in general to methods and apparati for calculating the image focus on cathode ray tubes.

When monitors and television sets are manufactured, not only the electrical values must be tested and adjusted, but also the image geometry and other image parameters must be set.

The automation of image adjustment not only makes it cheaper to manufacture such equipment, but also increases the yield and improves the quality of the sets.

Identification of image height, image width, image position and image brightness can, for example, be accomplished with known sensor systems. By contrast, the automatic identification of the image focus is very difficult to realize and requires very expensive equipment.

An additional problem is acquiring images from monitors or television sets having different standards. There are television sets that operate with 50 Hz or with 60 Hz field frequencies; in a monitor assembly line, for example, monitors that have three different field frequencies must be adjusted.

The invention enables the adjustment of the image focus of monitors, including those having different field frequencies, at a reduced cost and reduced complexity of apparatus.

2. Description of the Prior Art

Images, scripts, and graphics are produced on cathode ray tubes for television monitors. An optimum image focus is desired and since the image focus can differ at different locations on the monitor screen, the entire image content must be utilized for evaluating the image focus.

Until now, the picture screen of a monitor has been observed by the human eye. With adequate training, an employee looking at the picture screen can recognize the difference between the image focus at the edge and the focus in the middle. The adjustment of image focus occurs by adjusting a potentiometer in the deflection assembly.

Until the present time, such a procedure could only be automated using an extremely expensive apparatus.

For the automatic adjustment of the image focus, measuring marks on a part of the monitor image are recorded, for example by a solid state camera, with known methods. The camera signal is interpreted and the image focus is obtained with special and complicated hardware logic.

When monitors with multiple field frequencies must be adjusted, the known solution for 50 Hz monitors can only be applied in principle. An extension of the method would require further development of the hardware circuitry and of the method of measuring the average image focus over the entire image, such that a rapid adaption to the various field frequencies is possible.

It is known also known how to measure the image focus by way of the gradient distribution in the gray-scale image using an involved image processing system. In addition to the high cost for hardware and software, there is the disadvantage as in the previously discussed solution that an average image focus must be calculated using many measurements at different locations of the CRT screen. The time to acquire the image focus thus is usually too long. Times of a few hundred milliseconds are desirable in automated manufacture.

The following art discusses various cathode ray tube adjustment and monitoring systems. U.S. Pat. No. 4,163,308, U.S. Pat. No. 4,411,120, U.S. Pat. No. 3,962,722, U.S. Pat. No. 4,551,653, U.S. Pat. No. 4,193,086, European Patent No. 105,792, Patent Abstracts of Japan, Vol. 10, No. 297 of Oct. 9, 1986, No. 61-114437, the article entitled "A Technique for the Automated Measurement of the Resolution of Shadow Mask CRT Displays" by Veron and P. O'Callaghan SID 87 Digest Pages 211-213, German No. 2,030,417, German No. 2,805,691, German DE No. 3,107,042, German No. 2,746,969, German DE No. 3,047,340, German DE No. 2,839,187, French No. 2,497,399, European patent No. 0,119,282 and publication in Funkschau of May 1986, Pages 40-42.

SUMMARY OF THE INVENTION

The invention resulted from an assignment to provide a method and apparatus for automatically adjusting and balancing the focus of the image on a cathode ray tube that could also be utilized when the adjustment must occur on monitors or televisions with multiple field frequencies.

The assignment was resolved by the invention discussed in our Claim of Invention, and represents an improved method and apparatus for adjusting and balancing the focus of cathode ray tubes having different field frequencies.

The invention utilizes a special image with an optimal number of black to white transitions (for example forming a fine checkerboard pattern) that is projected by the apparatus to be adjusted on its picture screen. The image is acquired with a sensor, such as a solid-state camera, with further acquisition by an image processing system such that the fine point structure of the image is acquired with full resolution. The image focus is calculated using a histogram calculation; based on the data from the histogram curve, the focus of the cathode ray tube is improved by adjusting the CRT's deflection system (using, for example, the associated control potentiometer) either manually or automatically. The scan lines of the camera must be at right angles to the scan lines of the cathode ray tube.

In the invention, the magnification of the image on the cathode ray tube before the image is recorded by the sensor is selected such that the picture elements of the CRT are recorded with at least double resolution relative to the line resolution of the sensor (camera).

The substantial advantage of the invention is that the image focus can be determined on monitors or television sets which have different frame frequencies without requiring very expensive electronic hardware and by merely using standard image acquisition and image processing systems that are presently available.

Other goals, features, and advantages of the invention will be readily apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

FIG. 1 is a schematic diagram illustrating the method and apparatus of the invention;

FIG. 2 is a schematic diagram illustrating a modification of the invention; and

FIG. 3 is a plot of a histogram curve.

DESCRIPTION OF THE PREFERRED EMBODIMENTS

Figure 4:
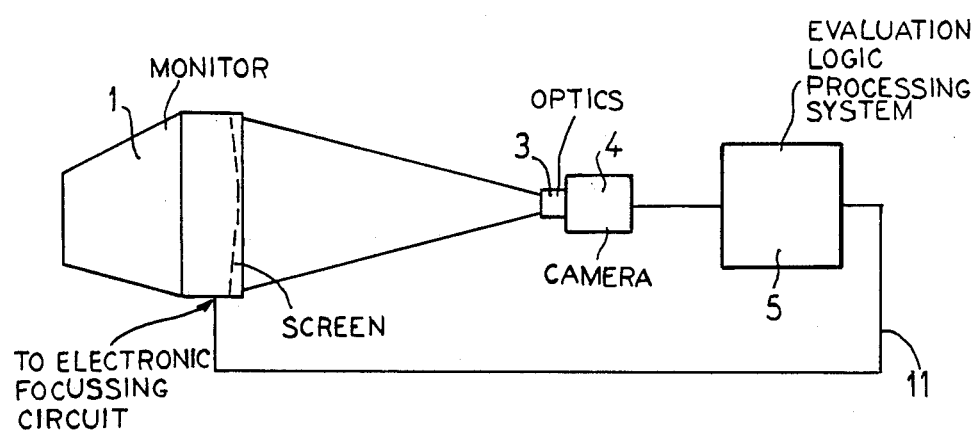
FIG. 4 is a schematic diagram illustrating how the focus can be electronically controlled.

FIG. 1 illustrates a cathode ray tube monitor 1 upon which is produced an image on the picture screen 2. A camera 4 with a suitable optics 3 detects the image on the picture screen 2 and supplies output electrical signals to an evaluation logic processing system 5.

FIG. 2, differs from FIG. 1 in that the image on the picture screen 2 of the monitor 1 is picked up by two side-by-side cameras 4 and 6 which have optics 3 and 3' as illustrated. The outputs of the cameras 4 and 6 are supplied to the image processing system 5.

In FIG. 3, the halftones or gray scale values of the image on the picture screen 2 are plotted on the x axis and the number of picture elements is plotted on the y axis to produce a histogram curve 7.

A special image is produced on the monitor 1 and is to be balanced and adjusted to control the focus. For example, a point structure similar to a fine checkerboard pattern is produced on the picture screen 2. Other patterns, such as a line-based structure, could also be used. The purpose of this special image is to produce an optimal number of black to white transitions on the picture screen. The concept "Optimal number of black to white transitions" includes the finest structure, physically representable by the monitor.

The monitor image is recorded with a solid state camera 4 in FIG. 1 or cameras 4 and 6 in FIG. 2. The image detail and the resolution are selected so that the fine point structure or other pattern is acquired with full resolution in the camera signal. The camera that is utilized has a CCD semiconductor sensor with a known number of photosensitive surface elements (pixels) on the sensor chip arranged in a matrix. In the same manner as the definition of the vertical and horizontal resolution of television images, the line resolution is known for every camera. This resolution is dependent not only on the number of pixels, but is also dependent on the bandwidth of the camera video amplifier which is connected to the sensor matrix. The resolution required for the invention is achieved when the monitor images fine structure is recorded with a double resolution relative to the camera resolution.

The camera signal is evaluated with a known image processing system 5. The image processing system 5 is also used so as to calculate the image position, the image height, the image width and so forth using other test patterns on the picture screen 2.

The focus of the picture screens image which was recorded as a gray-scale image, by the camera, is then calculated using the histogram 7. For example, in a binary image system, based on the following method:

The number of picture elements (sum m) whose voltage values in the gray-scale image lie above the threshold n is formed in the threshold stage n. Subsequently, the threshold is incremented by a value and the sum (m+1) of picture elements which have a voltage value that lie above the threshold (n+1) is calculated. The height of the curve to be illustrated for the gray scale value or picture half tone n in the histogram results from the difference between (m+1) and m. This calculation is carried out for the gray scale values or picture half tones 0 through 255 as illustrated in FIG. 3. The width of the histogram curve 7 is a measure of the image focus.

Given an unfocused image, for example, the corresponding potentiometer 9 in the deflection assembly of the monitor 1 can be adjusted either manually or automatically. When, for example, an electromotive screwdriver is attached to the arm of a robot, the arm of the robot can be controlled to turn the potentiometer 9 to make the adjustment. Different monitors differ not only in size but their potentiometers are located at different positions on the respective deflection assemblies. However, adjustment can be made for all sizes and types of monitors.

The output of the image processing system 5 can be supplied by lead 11 to a focussing motor 12 which has a shaft 13 connected to said potentiometer 9 so as to adjust the focus.

When the entire gray-scale image picked up by the camera is stored in the image processing system, the histogram calculation can occur in a brief time such as a few hundred milliseconds. The short acquisition time for the image focus required for automatic manufacture is thus achieved.

A mean value of the image focus for the entire monitor image can be calculated using the previously mentioned image magnification, required resolution, and respective histogram calculation made by acquiring all of the image on picture screen 2 using multiple cameras such as 4 and 6 illustrated in FIG. 2.

So as to acquire a disruption free image from different monitor types or television sets which operate with different field frequencies using inexpensive commercially available video cameras that are normally operated at 50 Hz or 60 Hz field frequencies, the line direction of the recording camera must be arranged to be 90° relative to the line direction of the monitor. Also, a simple synchronization of the image pickup can be realized.

Although the invention has been described with respect to preferred embodiments, it is not to be so limited as changes and modifications can be made therein which are within the fully intended scope as defined by the appended claims.

We claim as our invention:

1. A method for the automatic calculation of the image focus of a cathode ray tube which has a cathode beam which scans the screen of said tube with parallel scan lines which extend in a first direction and which has a focussing potentiometer, such as monochromatic and color monitors (1), comprising the steps of producing on the screen of the cathode ray tube (2) an image having an optimal number of black to white transitions, for example forming a fine checkerboard pattern or a fine line pattern, detecting said entire image with a first solid-state camera which includes a pickup tube which is scanned by a beam in parallel scan lines which extend in a second direction which is so mounted that said first direction is at right angles to said second direction and wherein said camera records with at least double resolution, acquiring with an image processing system (5) the fine point structure of the image with full resolution, calculating the image focus on the basis of a histogram calculation, and adjusting said focussing potentiometer in the deflection assembly of said cathode ray tube using the data from the histogram curve.

2. A method according to claim 1, wherein the width of said histogram curve, is utilized for calculating the image focus.

3. A method according to claim 1 wherein said adjusting is done with an electromotive screwdriver which is either held manually or attached to the arm of an industrial robot.

4. A method according to claim 1 wherein said adjusting of the image focus is accomplished by an electronic adjustment of the focus instead of by adjustment via potentiometer, whereby the desired value is transmitted to the monitor via an electronic interface.

5. A method according to claim 1 wherein to calculate the uniformly distributed image focus substantially the entire image on said cathode ray tube is detected with said first camera and a second solid state camera for calculating the image focus.

6. A method according to claim 5 wherein the scan line direction of said first and second cameras (4, 6) are arranged so as to be 90° relative to the scan line direction of said cathode ray tube (1) so as to obtain a disruption-free image pick-up from different cathode ray tube types that operate with different field frequencies and wherein said first and second cameras operate with 50 Hz or 60 Hz field frequencies.

* * * * *